US008941891B2

(12) United States Patent
Choe

(10) Patent No.: US 8,941,891 B2
(45) Date of Patent: Jan. 27, 2015

(54) ORGANIC LIGHT EMITTING DISPLAY DEVICE AND DRIVING METHOD THEREOF

(71) Applicant: Samsung Display Co., Ltd., Yongin (KR)

(72) Inventor: Won-Jun Choe, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/961,704

(22) Filed: Aug. 7, 2013

(65) Prior Publication Data

US 2014/0300937 A1   Oct. 9, 2014

(30) Foreign Application Priority Data

Apr. 8, 2013   (KR) .................. 10-2013-0038187

(51) Int. Cl.
H04N 1/04        (2006.01)
H04N 1/028       (2006.01)

(52) U.S. Cl.
CPC ................................... *H04N 1/0282* (2013.01)
USPC ........... 358/474; 358/518; 358/480; 359/619; 345/204; 250/492.2

(58) Field of Classification Search
CPC .......... G02F 1/13624; G02F 1/136213; G02F 1/13338; G02F 1/1362; G02F 2001/134345; G02F 1/133553; G02F 1/134363; G02F 2001/13312; G02F 2001/134372; G02F 2001/136231; G02F 1/133617; G02F 2001/133614
USPC ........... 345/76, 204, 205, 173, 175, 211, 690, 345/80, 89, 90, 100, 102, 103, 156, 179, 345/208, 214, 30, 55, 74.1, 87, 98; 359/619, 618; 348/E0.027; 250/492.2; 358/480, 1.15, 488, 448, 513, 514, 358/518, 474

See application file for complete search history.

(56) References Cited

U.S. PATENT DOCUMENTS

| | | | | |
|---|---|---|---|---|
| 7,081,716 B2* | 7/2006 | Choi et al. | ................. | 315/169.3 |
| 7,158,157 B2* | 1/2007 | Yamazaki et al. | ............ | 345/691 |
| 7,586,505 B2* | 9/2009 | Yamazaki et al. | ............ | 345/691 |
| 7,605,791 B2* | 10/2009 | Okuno | ................ | 345/98 |
| 7,990,481 B2* | 8/2011 | Hur et al. | ........................ | 349/12 |
| 8,054,279 B2* | 11/2011 | Umezaki et al. | ............. | 345/100 |
| 8,279,497 B2* | 10/2012 | Nakano et al. | ................ | 358/474 |
| 8,384,626 B2* | 2/2013 | Yamamoto et al. | ............. | 345/76 |
| 8,405,909 B2* | 3/2013 | Tanaka | ......................... | 359/618 |
| 8,477,157 B2* | 7/2013 | Otawara | ....................... | 345/690 |
| 8,619,011 B2* | 12/2013 | Kimura | ........................ | 345/90 |
| 8,624,846 B2* | 1/2014 | Fukunaga et al. | ............ | 345/173 |
| 8,810,615 B2* | 8/2014 | Takahashi et al. | ............ | 345/691 |
| 2006/0187167 A1* | 8/2006 | Okuno | ............................ | 345/98 |
| 2007/0285739 A1* | 12/2007 | Nakano et al. | ................ | 358/474 |
| 2009/0115801 A1* | 5/2009 | Jeon | ............................. | 345/690 |

\* cited by examiner

*Primary Examiner* — Negussie Worku
(74) *Attorney, Agent, or Firm* — Knobbe, Martens, Olson & Bear, LLP

(57) ABSTRACT

An organic light emitting diode (OLED) display is disclosed. One aspect includes a pixel unit including a plurality of pixels formed at portions at which scanning lines and data lines intersect with each other; a scan driver for supplying scan signals to the scanning lines. The OLED display further comprises a data driver for supplying data signals to the data lines; and a data compensation unit changing the input data using a correction coefficient stored as a unit of a pixel block including a plurality of pixels and supplying the changed input data to the data driver. In such OLED display, the pixel block is divided so that the number of pixel arranged in the first direction is different from the number of pixel arranged in the second direction which intersects with the first direction.

17 Claims, 7 Drawing Sheets

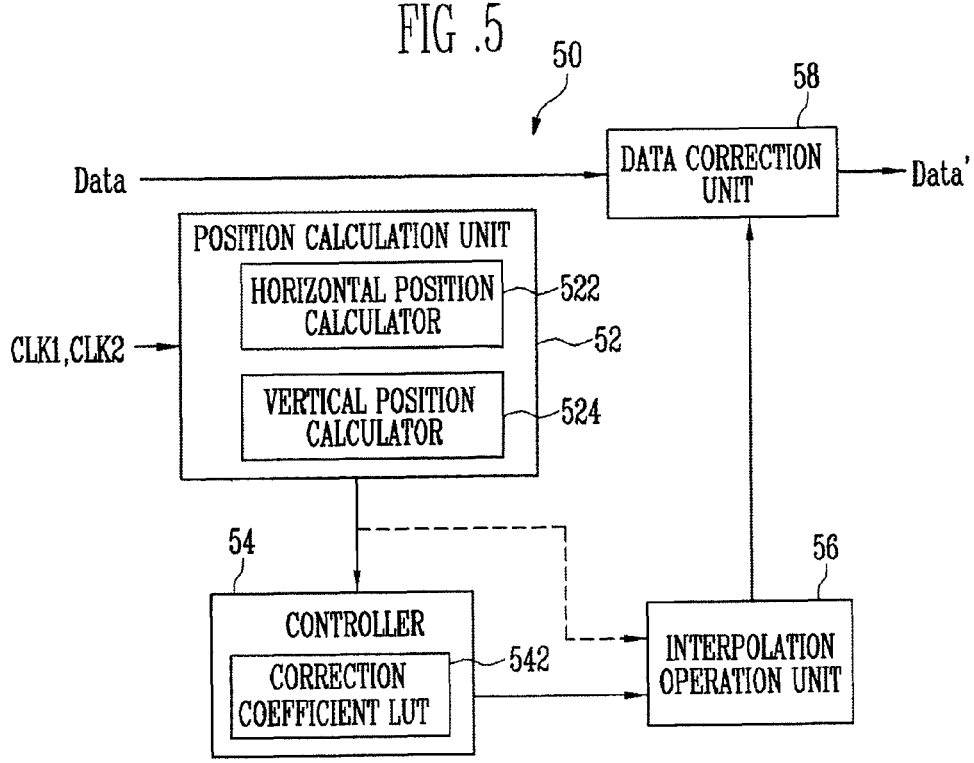

FIG. 6B

| BL | | | | | | | | | |
|---|---|---|---|---|---|---|---|---|---|
| P11 | P12 | P13 | P14 | ⋯ | | | | | P1m |
| P21 | P22 | P23 | P24 | ⋯ | | | | | P2m |
| P31 | P32 | P33 | P34 | ⋯ | | | | | P3m |
| P41 | P42 | P43 | P44 | ⋯ | | | | | P4m |
| P51 | ⋮ | ⋮ | ⋮ | ⋱ | | | | | ⋮ |
| P61 | | | | | | | | | |
| P71 | | | | | | | | | |
| P81 | | | | | | | | | |
| ⋮ | | | | | | | | | |
| | | | | | | | | | |
| | | | | | | | | | |
| | | | | | | | | | |
| Pn1 | Pn2 | Pn3 | Pn4 | ⋯ | | | | | Pnm |

FIG. 6C

| BL | | | | | | | | | |
|---|---|---|---|---|---|---|---|---|---|
| P11 | P12 | P13 | P14 | ⋯ | | | | | P1m |
| P21 | P22 | P23 | P24 | ⋯ | | | | | P2m |
| P31 | P32 | P33 | P34 | ⋯ | | | | | P3m |
| P41 | P42 | P43 | P44 | ⋯ | | | | | P4m |
| ⋮ | ⋮ | ⋮ | ⋮ | ⋱ | | | | | ⋮ |
| | | | | | | | | | |
| | | | | | | | | | |
| | | | | | | | | | |
| | | | | | | | | | |
| | | | | | | | | | |
| | | | | | | | | | |
| | | | | | | | | | |
| Pn1 | Pn2 | Pn3 | Pn4 | ⋯ | | | | | Pnm |

FIG. 7B

| BL | | | | | | | | | |
|---|---|---|---|---|---|---|---|---|---|
| P11 | P12 | P13 | P14 | P15 | P16 | P17 | P18 | ⋯ | P1m |
| P21 | P22 | P23 | P24 | ⋯ | | | | | P2m |
| P31 | P32 | P33 | P34 | ⋯ | | | | | P3m |
| P41 | P42 | P43 | P44 | ⋯ | | | | | P4m |
| ⋮ | ⋮ | ⋮ | ⋮ | ⋱ | | | | | ⋮ |
| | | | | | | | | | |
| | | | | | | | | | |
| | | | | | | | | | |
| | | | | | | | | | |
| Pn1 | Pn2 | Pn3 | Pn4 | ⋯ | | | | | Pnm |

FIG. 7C

| BL | | | | | | | |
|---|---|---|---|---|---|---|---|
| P11 | P12 | P13 | P14 | ⋯ | | | P1m |
| P21 | P22 | P23 | P24 | ⋯ | | | P2m |
| P31 | P32 | P33 | P34 | ⋯ | | | P3m |
| P41 | P42 | P43 | P44 | ⋯ | | | P4m |
| ⋮ | ⋮ | ⋮ | ⋮ | ⋱ | | | ⋮ |
| | | | | | | | |
| | | | | | | | |
| | | | | | | | |
| | | | | | | | |
| Pn1 | Pn2 | Pn3 | Pn4 | ⋯ | | | Pnm |

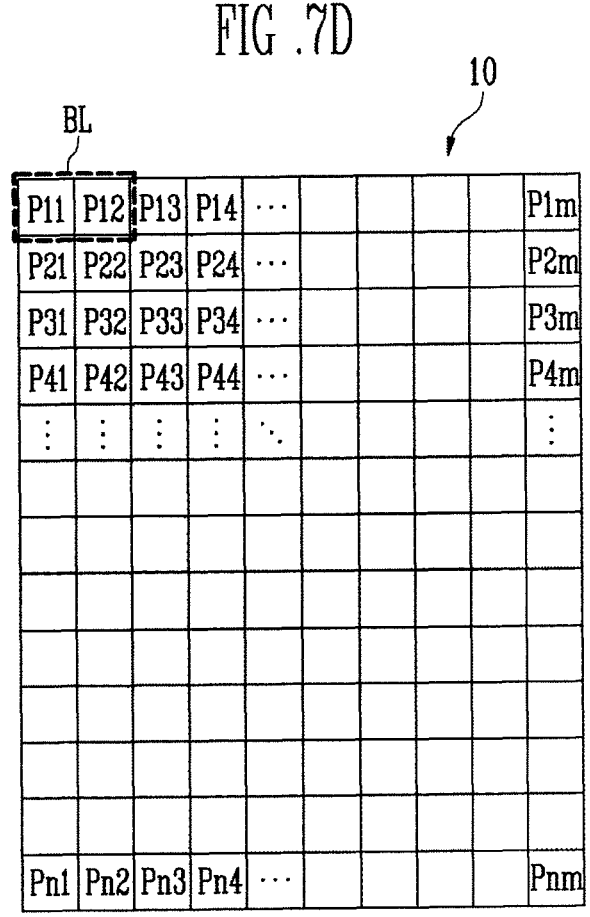

ORGANIC LIGHT EMITTING DISPLAY DEVICE AND DRIVING METHOD THEREOF

CROSS-REFERENCE TO RELATED APPLICATION

This application claims priority to and the benefit of Korean Patent Application No. 10-2013-0038187, filed on Apr. 8, 2013, in the Korean Intellectual Property Office, the entire content of which are incorporated herein by reference in their entirety.

BACKGROUND

1. Field

The disclosed technology relates to an organic light emitting display and a driving method thereof.

2. Description of the Related Technology

Flat panel displays generally have reduced weight and volume when compared to a cathode ray tube display. There are several types of flat panel display technologies including liquid crystal displays, field emission displays, plasma display panels, organic light emitting diode (OLED) displays, and the like.

Among these technologies, the OLED display, which displays an image using an organic light emitting diode generating light by recombination of electrons and holes, generally has a fast response speed and is driven at a low power.

SUMMARY OF CERTAIN INVENTIVE ASPECTS

According to one exemplary aspect, an organic light emitting diode (OLED) display includes: a plurality of pixels formed at portions at which scanning lines and data lines intersect with each other; a scan driver for supplying scan signals to the scanning lines; a data driver for supplying data signals to the data lines; and a data compensation unit changing the input data using a correction coefficient stored as a unit of a pixel block including a plurality of pixels and supplying the changed input data to the data driver, wherein the pixel block is divided so that the number of pixel arranged in the first direction is different from the number of pixel arranged in the second direction which intersects with the first direction.

The pixel unit may be divided into at least two areas having a boundary portion overlapped with each other and then the crystallization process is performed, and the pixel block may be divided so that the number of pixels arranged in the same direction with the boundary line generated while being overlapped with each other in the boundary portion is more than that of the pixel arranged in the direction in which intersects with the boundary line.

In the pixel block, the number of the pixel arranged the same direction with the boundary line is set by at least two, and the number of the pixel arranged in the direction intersecting with the boundary line may be set by at least one.

The data compensation unit receives the clock signals for counting the position of the pixels together with the input data and in response, changes the input data detecting a correction coefficient stored as a unit of a pixel block, and applies the other correction value for each position according to at least one direction of either the first or the second direction for the pixels included in each pixel block corresponding to position information of the detected pixels using the clock signals.

The data compensation unit applies other correction values to the pixels included in the pixel block for each position in the direction in which at least more pixels may be arranged in either the first or the second direction.

The data compensation unit applies the other correction value by an interpolation method for each position in either the first or the second direction for the pixels included in the pixel block.

The data compensation unit, including: a position calculation unit receiving the clock signal for counting the position of the pixels, and in response, generating the position information of the pixels; a controller receiving the position information of the pixels from the position calculation unit and detecting the correction coefficient stored in the pixel block unit; an interpolation operation unit generating the other correction value for each position in either the first or the second direction of the pixels included in the pixel block using the position information and the correction coefficient of the pixels; and a data correction unit changing the input data using the input data and the correcting value and outputting the changed data.

The position calculation unit, includes: a horizontal position calculator receiving the first clock signal for counting the horizontal position of the pixels and in response, generating the horizontal position information of the pixels; and a vertical position calculator receiving the second clock signal for counting the vertical position of the pixels and in response, generating the vertical position information of the pixels.

The controller may include the correction coefficient lookup table in which the correction coefficient as a unit of the pixel block is stored.

According to another aspect, a driving method of an organic light emitting display includes: receiving clock signals for counting position of pixels formed in a pixel unit and generating a position information of the pixels; extracting a correction coefficient of the pixel block having the pixels included therein among the correction coefficients as a unit of pixel block stored in advance using the position information of the pixels; changing input data using the correction coefficient and outputting changed data; and generating data signal using the changed data. The pixel block is divided so that the number of pixel arranged in the first direction is different from the number of pixel arranged in the second direction which intersects with the first direction.

The pixel unit may be divided into at least two areas having a boundary portion overlapped with each other and then the crystallization process is performed, and the pixel block may be divided so that the number of pixels arranged in the same direction with the boundary line generated while being overlapped with each other in the boundary portion is more than that of the pixel arranged in the direction in which intersects with the boundary line.

A driving method of an organic light emitting display further including generating the correction value of pixels included in the corresponding pixel block after extracting the correction coefficient of the pixel block, base on the correction coefficient and generating the other correction value for the pixels for each position according to at least one direction of either the first or the second direction in the pixel block using the position information of the pixels, wherein in changing the input data, the correction value is applied.

The other correction values for the pixels are generated using an interpolation method for each position according to at least one direction of either the first or the second direction in the pixel block.

The other correction values for the pixels may be generated for each position in the direction in which at least many pixels are arranged in either the first or the second direction for the pixels included in the pixel block.

BRIEF DESCRIPTION OF THE DRAWINGS

FIG. 5 is a view showing an example of a data compensation unit shown in FIG. 3.

FIGS. 6A to 6D are views showing a method of dividing pixel blocks according to one exemplary embodiment.

FIGS. 7A to 7D are views showing a method of dividing pixel blocks according to another exemplary embodiment.

DETAILED DESCRIPTION OF CERTAIN ILLUSTRATIVE EMBODIMENTS

An organic light emitting display includes pixels formed in a matrix.

Each of the pixels display a discrete portion of a predetermined image by controlling the amount of current supplied to the organic light emitting diode corresponding to a data signal. Each of the pixels includes a plurality of transistors.

The transistors described above generally include a semiconductor layer, a gate electrode, a source electrode, and a drain electrode including a source area, a drain area, and a channel area. The semiconductor layer is made of polycrystalline silicon (poly-si) or amorphous silicon (a-si). The polycrystalline silicon (poly-si) having a high electron mobility has been currently used as the semiconductor layer in most of the organic light emitting display.

The polycrystalline silicon is generated by forming the amorphous silicon on a substrate and crystallizing the amorphous silicon. In this configuration, various methods for crystallizing the amorphous silicon may be used. However, in most of processes, a method for crystallizing the amorphous silicon into the polycrystalline silicon by irradiating with laser such as an excimer laser annealing (ELA) method has been currently used.

However, the process for crystallizing the amorphous silicon into the polycrystalline silicon by irradiating with the laser has a large effect on characteristics of the mobility, a threshold voltage and the like of the transistors. Therefore, the laser should be uniformly irradiated to the transistors in order to prevent a characteristic deflection between the pixels.

Nevertheless, since an ELA crystallize equipment is manufactured in a predetermined size, a size of a laser bar capable of irradiated at a time by the ELA crystallize equipment has a difficulty in covering all of the transistors formed on the panel.

Figure 1:
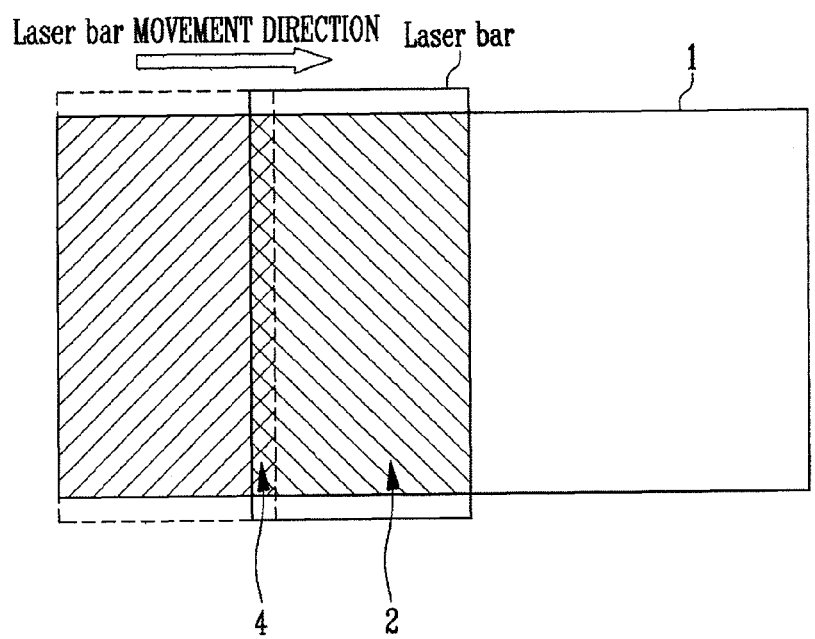
FIG. 1 is a view showing a crystallization process of a panel using a laser.
Figure 2:
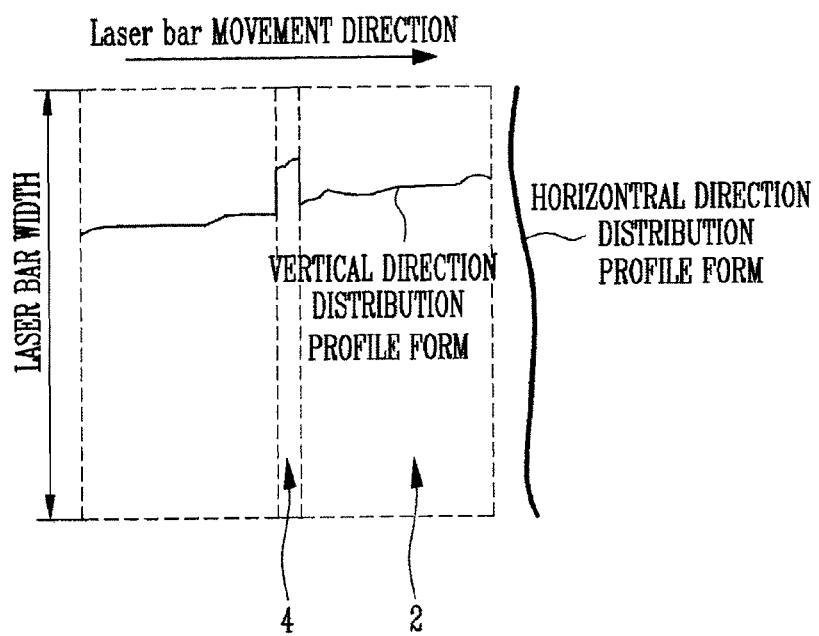
FIG. 2 is a view showing a characteristic distribution of pixels generated during the crystallization process shown in FIG. 1.

FIG. 1 is a view showing a crystallization process of a display panel using a laser and FIG. 2 is a view showing a characteristic distribution of pixels generated during the crystallization process shown in FIG. 1.

First, referring to FIG. 1, an area of the panel 1 is divided for crystallizing the transistors formed on the large panel to irradiate the laser to the divided area.

In this configuration, in a boundary portion 4 of the divided area due to a margin error of the ELA crystallize equipment, the crystallization process is generally performed two times. That is, in the configuration of dividing the panel 1 into a plurality of areas to irradiate the laser to the divided area, in the boundary portion 4 of the divided area, the crystallization process (that is, the laser is irradiated two times) is performed two times.

In this configuration, the characteristics of the transistors located in the boundary portion 4 of the divided area has a relative large deflection comparing with the characteristics of the transistors located in remaining areas 2, such that the characteristic deflection between pixels based on the boundary portion 4 is prominently generated.

Therefore, as shown in FIG. 2, the characteristic deflection of the transistors shows in the larger form in the boundary portion 4 of the divided area as compared to the remaining areas 2, and thus, an image defect due to a faulty line may occur.

Embodiments of the organic light emitting display efficiently compensate for the characteristic deflection of the pixels, thereby making it possible to improve the image quality, and a driving method thereof.

Figure 3:
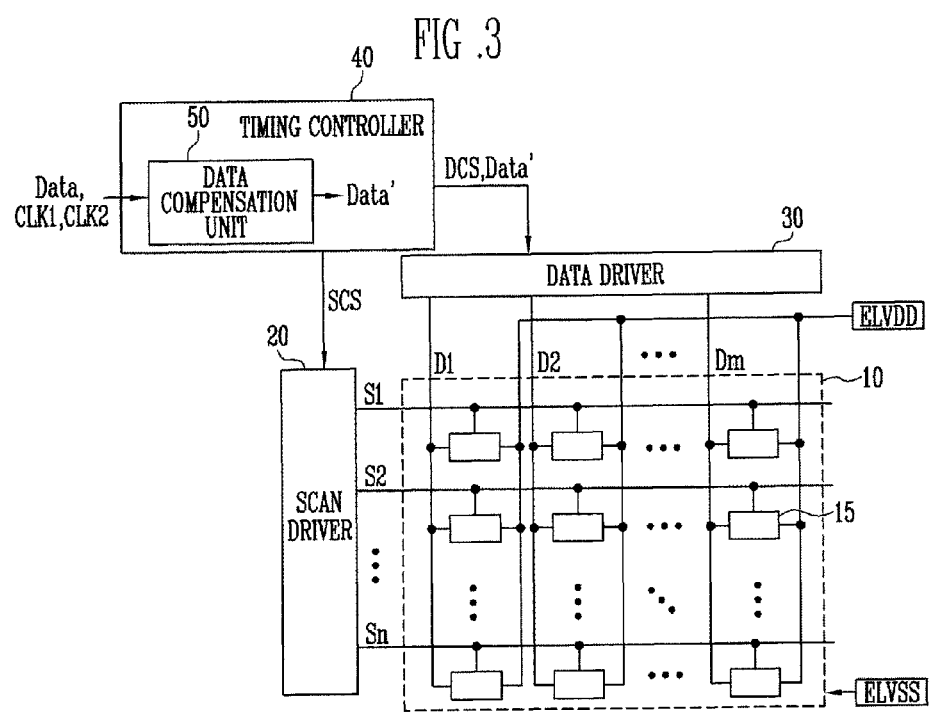
FIG. 3 is a view showing an organic light emitting display according to an exemplary embodiment.
Figure 4:
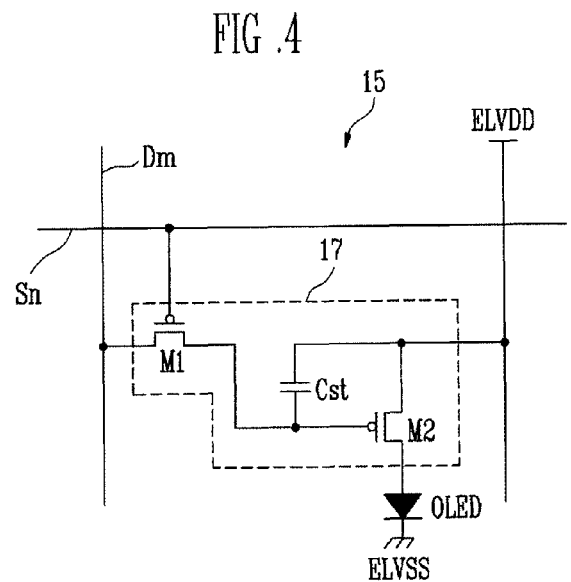
FIG. 4 is a view showing an example of the pixel shown in FIG. 3.

FIG. 3 is a view showing an organic light emitting display according to an exemplary embodiment. FIG. 4 is a view showing an example of the pixel shown in FIG. 3.

First, referring to FIG. 3, the organic light emitting display includes a pixel unit 10, a scan driver 20, a data driver 30, and a timing controller 40. In addition, the organic light emitting display further includes a data compensation unit 50 for changing an input data Data to generate a output data Data', and the data compensation unit 50 may be included in the timing controller 40 as an example.

The pixel unit 10 is a main element configuring a panel of the organic light emitting display and includes a plurality of pixels 15 formed at crossed portion of scanning lines S1 to Sn and data lines D1 to Dm. The pixel unit 10 receives scan signals and data signals from the scanning lines S1 to Sn and the data lines D1 to Dm, respectively. Further, the pixel unit 10 receives a first and second pixel power ELVDD and ELVSS from an external power circuit (not shown).

The pixels 15 receiving the first and second pixel power ELVDD and ELVSS emits light of a luminance corresponding to the data signal input when the scan signal is supplied.

Each of the pixels 15 includes an organic light emitting diode (OLED) and a pixel circuit 17 for controlling an amount of current supplied into the organic light emitting diode (OLED) as shown in FIG. 4. Here, FIG. 4 shows an example for schematically explaining a structure of the pixel, a structure of the pixel circuit 17 or a connecting structure the pixel circuit 17 and the organic light emitting diode (OLED).

Referring to FIG. 4, the pixel 15 includes a pixel circuit 17 connected to an organic light emitting diode (OLED), a scanning line Sn, and a data line Dm to control the organic light emitting diode (OLED).

An anode electrode of the organic light emitting diode (OLED) in connected to the pixel circuit 17, and a cathode electrode thereof is connected to a second pixel power ELVSS. Such the organic light emitting diode (OLED) emits light of a luminance corresponding to a driving current controlled by the pixel circuit 17.

The pixel circuit 17 controls an amount of current supplied into the organic light emitting diode (OLED) corresponding to the data signal supplied into the data line Dm when the scan signal is supplied to the scanning line Sn.

The pixel circuit 17 includes a first transistor M1 connected to the scanning line Sn, the data line Dm and a second transistor M2, the second transistor M2 connected between the first pixel power ELVDD and the organic light emitting diode (OLED), and a storage capacitor Cst connected between a first electrode and a gate electrode of the second transistor M2.

The gate electrode of the first transistor M1 is connected to the scanning line Sn, and the first electrode is connected to the data line Dm. In addition, a second electrode of the first transistor M1 is connected to one side terminal of the storage capacitor Cst. In this configuration, the first electrode is set any one of a source electrode and a drain electrode, and the second electrode is set to the electrode different from the first electrode. For example, the second electrode is set to the drain electrode in the configuration in which the first electrode is set to the source electrode. The first transistor M1 described above is turned on when the scan signal is supplied from the scanning line Sn, and supplies the data signal supplied from the data line Dm to the storage capacitor Cst. Then, the storage capacitor Cst is charged with a corresponding voltage to the data signal.

The gate electrode of the second transistor M2 is connected to the one side terminal of the storage capacitor Cst, and the first electrode thereof is connected to the other side terminal of the storage capacitor Cst and the first pixel power ELVDD. In addition, the second electrode of the second transistor M2 is connected to the anode electrode of the organic light emitting diode (OLED). The second transistor M2 controls the driving current flowing to the second pixel power ELVSS via the organic light emitting diode (OLED) from the first pixel power ELVDD corresponding to a voltage value stored in the storage capacitor Cst.

Then, the organic light emitting diode (OLED) generates the light corresponding to the driving current supplied from the second transistor M2.

Therefore, with the pixels 15 of the organic light emitting display, since a characteristic of the transistors M, particularly, the second transistor M2 controlling the driving current determines a luminescence brightness of the pixels 15, the characteristic of the transistors M has a great effect on the image quality.

However, as described above, the display panel, which is main element of the pixel unit 10, is divided into at least two of area and then a crystallization process is performed thereon. That is, the pixel unit 10 is divided into at least two areas having a boundary portion overlapped with each other and is crystallized, and thus, a large characteristic deflection between the pixels 15 is generated, such that an image defect due to a faulty line may occur. Accordingly, the characteristic deflection of the pixels 15 should be compensated during operation to account for individual pixel defects made at manufacture time.

Therefore, an input data Data is changed so that a characteristics deflection of the pixels 15 is compensated, and more particularly, the pixel unit 10 shown in FIG. 3 is divided into a plurality of pixel blocks including a plurality of pixels, thereby making it possible to efficiently compensate the characteristic deflection of the pixels, and a exemplary description thereof will be provided below.

Referring to FIG. 3, the scan driver 20 generates a scan signal corresponding to a scanning control signal SCS supplied from a timing controller 40 and then the generated scan signals are sequentially supplied to the scanning lines S1 to Sn. When the scan signals are supplied to the scanning lines S1 to Sn, the pixels 15 are sequentially selected in a horizontal line.

The data driver 30 generates the data signal using the data Data' and the data control signal DCS supplied from the timing controller 40, and the generated data signals supplies to the data lines D1 to Dm whenever the scan signal is supplied. Then, the data signals are supplied to the pixels 15 selected by the scan signals. In this configuration, the changed data Data' is supplied to the data driver 30 so that the pixel variation is compensated by the data compensation unit 50.

The timing controlling unit 40 generates a scan control signal SCS and a data control signal DCS corresponding to synchronizing signals supplied from the outside. The scan control signal SCS generated from the timing controller 40 is supplied to the scan driver 20, and the data control signal DCS is supplied to the data driver 30. Further, the timing controller 50 rearranges the data that is externally supplied before supply to the data driver 30.

However, the timing controller 40 changes the input data Data so that the characteristic variation between the pixels 15 is compensated and includes the data compensation unit 50 which outputs the changed data Data'. That is, the input data Data is changed by the data compensation unit 50 to supply to the data driver 30.

The data compensating unit 50 receives the input data Data and clock signals CLK1 and CLK2 from the outside and changes the input data Data from each a position of the pixels 15 detected by the clock signals CLK1 and CLK2 to output the changed data Data'.

In particular, the data compensation unit 50 changes the input data Data using a correction coefficient stored in a pixel block including the plurality of pixels 15. In this configuration, the pixel blocks are divided so that the number of the pixels arranged in a first direction, for example, a horizontal direction is different from the number of the pixels arranged in a direction in which the first and second directions intersect with each other, for example, a vertical direction.

Configurations of the data compensation unit 50 and the pixel block described in embodiments and a method of changing the input data Data using the configurations will be described in detail with reference to FIGS. 5 to 7D.

FIG. 5 is a view showing an example of a data compensation unit shown in FIG. 3. Further, FIGS. 6A to 6D are views showing a method of dividing pixel blocks according to one exemplary embodiment, and FIGS. 7A to 7D are views showing a method of dividing pixel blocks according to another exemplary embodiment.

First, referring to FIG. 5, the data compensation unit 50 includes a position calculation unit 52, a controller 54, an interpolation operation unit 56, and a data correction unit 58. The data compensation unit 50 receives the input data Data and the clock signals CLK1 and CLK2 and in response, changes the input data Data detecting a correction coefficient stored in a pixel block. The other correction value for each position according to the first and/or second direction(s) is applied to the pixels included in each pixel block corresponding to position information of the detected pixels using the clock signals CLK1 and CLK2.

In more detail, the position calculation unit 52 receives the clock signals CLK1 and CLK2 for counting to the position of the pixels and generates the position information of the pixels corresponding to the clock signal. The position calculation unit 52 may include a horizontal position calculator 522 receiving the first clock signal CLK1 for counting the horizontal position of the pixels and generating the horizontal position information of the pixels and a vertical position calculator 524 receiving the second clock signal CLK2 for counting the vertical position of the pixels and generating the vertical position information of the pixels. The horizontal position calculator 522 and the vertical position calculator 524 may include, by way of example, a counter and a decoder, respectively.

The controller 54 receives the position information of the pixels from the position calculation unit 52 and detects the correction coefficient stored in the pixel block. The controller 54 includes a lookup table (hereinafter, correction coefficient LUT 542) in which the correction coefficient in the pixel block is stored.

Here, the correction coefficient for all the pixel blocks or the correction coefficient for the pixel blocks in the horizontal line may store in the correction coefficient LUT 542. For instance, after the correction coefficient for all the pixel blocks is stored in a memory included in a terminal set including a panel, that is, a motherboard, the correction coefficient for the pixel block in the corresponding horizontal line for each of the horizontal lines in the pixel block is detected from the motherboard, thereby making it possible to store in the correction coefficient LUT 542 in the data compensation unit 50. In this configuration, the information stored in the correction coefficient LUT 542 may renew each the horizontal line in the pixel block, for this, the data compensation unit 50 may further receive the correction coefficient together with the input data Data from the outside.

As described above, instead of storing the correction coefficient for each of all the pixels, in the configuration storing the correction coefficient in the pixel block including the plurality of pixels, the correction coefficient LUT 542 lowers a memory usage and frequency of use thereof and has the advantage of favorable in securing mass production.

In this configuration, precision of the correction coefficient is measured to be low according to the pixel block unit from measuring characteristics of the pixels, such that the correction coefficient in the pixel block is stored as the correction coefficient capable of correcting the characteristic deflection of the corresponding pixel block, or stored to set as a representative value, for example, an average value of the correction coefficients capable of correcting the characteristic deflection of the pixels included in the each pixel block measuring the characteristic each of the pixels in the measuring. Further, a method for determining it may be variously changed.

However, when dividing the pixel blocks, the degree of the characteristic deflection of the pixel is generated and a form of the pixel identify, thereby optimizing the efficiency of the pixel block in consideration of the precision of the correction coefficient and mass productivity.

The characteristic deflection of the pixels may compensate using the different precision for the horizontal direction and vertical direction of the pixel unit whether or not a need exists for a precision correction.

With each direction of the pixel unit, a correction precision may be determined according to the number of the pixel included in the pixel block. For example, with respect to any one direction of the pixel unit, as the number of pixels included in a pixel block becomes smaller, more pixel blocks in the corresponding direction are formed, such that the correction precision is improved. Otherwise, the correction precision is low, but the memory efficiency and the like can be improved as part of the overall design tradeoff.

Therefore, the pixel blocks can be divided so that the number of pixel arranged in a first direction, for example, the horizontal direction in which a characteristic deflection of the pixels generally occurs and the number of pixel arranged in a second direction, for example, vertical direction are different from each other.

For example, as shown in FIG. 1, when a laser bar moves in the horizontal direction, since the characteristic of the pixels located boundary portion 4 at which the laser bars are overlapped with each other may greatly differ from the characteristic of the pixels located at the remaining area 2, a boundary line exists. This line in which the characteristic deflection of the pixels often show is generated in the vertical direction. Therefore, the need exists for the precision correction in the horizontal direction in order to efficiently compensate. In this configuration, the pixel block is configured to have a few number of pixel arranged in the horizontal direction, for this, the number of pixel arranged in the horizontal direction may be set at least one pixels.

In addition, when the laser bar moves in the horizontal direction, a characteristic deflection between the pixels arranged in the vertical direction is relatively small. Therefore, the pixel block lowers the precision thereof with respect to the vertical direction, thereby making it possible to implement a high memory efficiency. The pixel block arranged in the vertical direction may be set to have at least two of pixels more than the pixel arranged in the horizontal direction.

That is, as the pixel unit 10 is crystallized, when the pixel block is divided into at least two areas having the boundary portion 4 overlapping with each other and is crystallized the pixel block is divided. This is so that the number of pixels arranged in the same direction with the boundary line generated while overlapping in the boundary portion 4 is more than that of the pixel arranged in the direction in which intersects with the boundary line. For example, in a pixel block, the number of the pixels arranged the same direction with the boundary line is set to at least two, and the number of the pixels arranged in the direction intersecting with the boundary line is set to at least one.

The laser bar as described above moves in the horizontal direction, and thus, various embodiments dividing the pixel blocks in the pixel unit 10 are disclosed in FIGS. 6A to 6C.

For example, as shown in FIG. 6A, a pixel block BL may be divided so that a pixel P is arranged in a horizontal direction and four pixels P are arranged in a vertical direction. In this configuration, in the boundary portion at which the laser is irradiated two times, since a characteristic deflection is compensated in a pixel in the horizontal direction in which the large characteristic deflection may occur suddenly, thereby to obtain a high correction precision. Further, the boundary portion allows a memory usage and frequency of use thereof to be lowered by lowering the correction precision, thereby making it possible to efficient compensate the characteristic deflection of the pixels P in the vertical direction in which a degree of characteristic deflection is relatively small and the large characteristic deflection may not occur suddenly.

In addition, as shown in FIG. 6B, the number of the pixel P arranged in the vertical direction increases in the pixel block BL and as shown in FIG. 6C, the number of the pixel P arranged in the horizontal direction increases in the pixel block BL, hereby, a memory usage and frequency of use thereof in order to store the correction coefficient may be further lowered. In addition, it may be variously changed so that all of the number of the pixels P arranged in the vertical and horizontal directions in the pixel block BL increase.

Figure 6D:
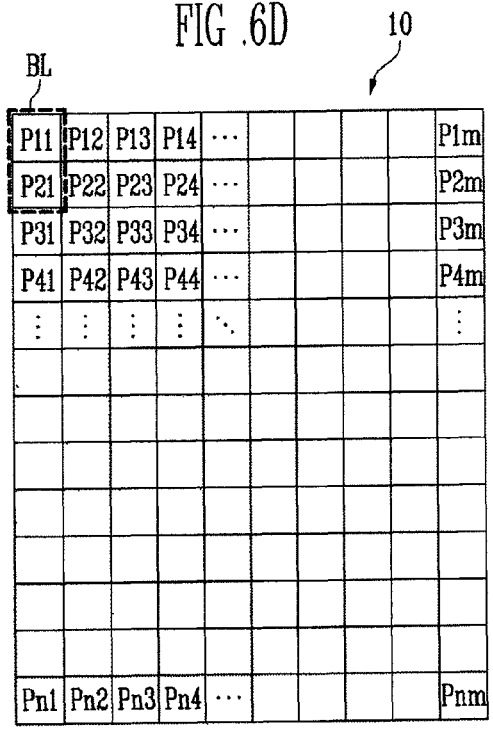
Figure 7A:
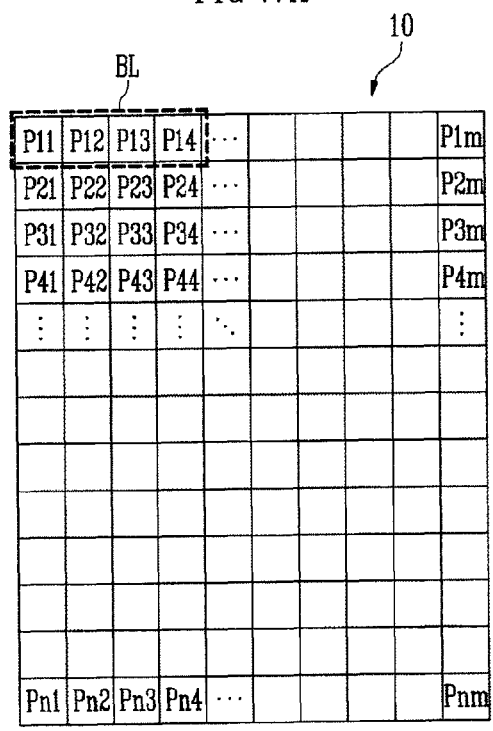

On the other hand, as shown in FIG. 6D, the correction coefficient may be increased by reducing the number of the pixels P arranged in the vertical direction in the pixel block BL.

In this configuration, the number of the pixels P arranged in the vertical and horizontal directions in the pixel block BL may be set to a 2 exponentiation to allow binary operations to be easily operated.

That is, the system divides the pixel unit 10 into a plurality of pixel blocks BL including the plurality of pixels P, stores the correction coefficient in the pixel block BL, and efficiently compensates the characteristic deflection of the pixels by distinguishing the direction. This is dependent on whether the design requires the precision correction at the time of dividing the pixel block BL.

In addition, the system may apply the different correcting value in order to naturally and precisely correct the characteristic deflection of the pixels for the direction in which a need does not exists for the correction coefficient. That is, a direction in which more numbers of pixels P are arranged in the first direction and second direction, for example, as shown in FIGS. 6A to 6D, when the pixel block BL is divided, the correcting value is differently applied to the pixels P in the pixel block BL at each position in the vertical direction.

To this end, as shown in FIG. 5, the data compensation unit 40 includes an interpolation operation unit 56.

The interpolation operation unit 56 generates the different correcting value in every position in first and/or second direction(S) for the pixels P included in a pixel block BL using the correction coefficient of the corresponding pixel block BL supplied from the controller 54 together with the position information of the pixels P supplied from the position calculation unit 52 and/or the controller 54, operating of the correcting value may be achieved by the interpolation operation. The interpolation operation described above may be performed by a selected interpolation method among various interpolation methods such as linear, bilinear, spline, and polynomial.

That is, when the position of the pixels P by the position calculation unit 52 is detected, the correction coefficient according to the position of the pixels P by the controller 52 extracts each pixel block BL, and the different correction coefficient is calculated for the pixels P in the pixel block BL by the interpolation operation unit 56.

In this configuration, the interpolation operation unit 56 differently applies the correction value for the pixels P in the pixel block BL in every position in the direction in which more numbers of pixels P are arranged. When the plurality of the pixels P are arranged in both directions, the correction value for the pixels P is differently applied in every position in the direction in which more numbers of pixels P are arranged, or the correction value for the pixels P is differently applied in every position in both directions, and may be variously changed.

The correcting value for each pixel calculated from the interpolation operation unit 56 is input to the data correction unit 58. Then, the data correction unit 58 changes the input data Data using the input data Data and the correcting value to output the changed data Data t The changed data Data for each pixel calculated from the interpolation operation undata driver 30 shown in FIG. 3 and is used to generate the data signal. Therefore, the pixels 15 are provided with the data signal that the characteristic deflection thereof is compensated. Accordingly, an image with uniform quality may be displayed.

The above mentioned embodiments are described by assuming that the boundary line is generated in the vertical direction while moving the laser bar in the horizontal direction.

For example, the boundary line may also be generated in the horizontal direction while moving the laser bar in the vertical direction, in this configuration, the pixel block BL may be divided so that more number of pixels P are arranged in the horizontal direction as shown in FIGS. 7A to 7D. Further, in the interpolation operation unit 56 shown in FIG. 5, the correcting value may be applied differently to every position of the pixels P in the horizontal direction.

A driving method of an organic light emitting display according to one exemplary embodiment, includes: generating a position information of pixels P by receiving clock signals CLK1 and CLK2 for counting position of the pixels P; extracting a correction coefficient of the pixel block having the pixels P included therein among the correction coefficient as the unit of pixel block BL stored in advance by using the position information of the pixels P; outputting changed data Datacludes: ge: generating Data using the correction coefficient; and generating data signal using the changed data Datane In particular, divides the pixel block BL dividing the direction that a precision correction would be desirable. According to this, the pixel block BL is divided in order to the number of pixel arranged in the first direction is different from the number of pixel arranged in the second direction that intersects with the first direction.

However, after extracting the correction coefficient of the corresponding pixel block BL, base on this, in generating the correction value of pixels P in the pixel block BL, the other correction value may be generated and applied in accordance with an interpolation method and the like for each position according to at least one direction of either the first or the second direction for each pixel P in the pixel block BL using the position information of pixels P.

Specifically, if the correction value is applied differently to the pixels P, the boundary approbation between the pixel blocks BL may be moderated at least for the direction that the degree of precision is set to be low.

That is, an image quality of the organic light emitting display may be efficient improved by storing the representative correction coefficient as a unit of pixel block BL which includes a plurality of pixels P, based on this, changing input data by interpolation method on changing input data Data and applying the correction coefficient recalculated according to position of pixels P in the pixel block BL as the correction value, Therefore, as mentioned above, the pixel block BL divides to distinguish the direction which a need exists for a precision correction or doesnue, lue, ient as a unit of pixel block BL which includes a plurality of pixels P, based on this, changing input data by interp thereof are lowered to secure the mass productivity simultaneously performs the precision correction on the direction which the precision correction is required, thereby making it possible to efficient compensate the characteristic deflection of the pixels P.

Also, with the Pixels P in the pixel block BL, the other correction value is applied for each position according to the first and/or second direction(s), such the boundary approbation between the pixel blocks BL may be moderated and an image quality of an organic light emitting display is more efficient improved.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An organic light emitting display device, comprising:
a pixel unit formed at the intersection of a plurality of scan lines and a plurality of data lines, the pixel unit including a plurality of pixels divided into a plurality of pixel blocks, wherein each pixel block includes a plurality of adjacent pixels;
a scan driver configured to supply a plurality of scan signals to the scan lines;
a data driver configured to supply a plurality of data signals to the data lines; and
a data compensation unit storing a plurality of correction coefficients respectively corresponding to the pixel blocks, wherein the data compensation unit is configured to i) change input data for each pixel block based on the corresponding correction coefficient and ii) supply the changed input data to the data driver,
wherein the number of pixels arranged in a first direction in each of the pixel blocks is different from the number of pixels arranged in a second direction which is perpendicular to the first direction.

2. The organic light emitting display device of claim 1, wherein the pixel unit is divided into at least two areas sharing an overlapping boundary line formed through a crystallization process,
wherein the number of pixels arranged in the same direction as the boundary line in each of the pixel blocks is greater than the number of pixels arranged in the direction in which intersects with the boundary line.

3. The organic light emitting display device of claim 2, wherein in the pixel block, the number of the pixels arranged in the same direction as the boundary line is set to at least two and the number of the pixels arranged in the direction intersecting with the boundary line is set to at least one.

4. The organic light emitting display device of claim 1, wherein the data compensation unit is further configured to i) receive a plurality of clock signals for counting the positions of the pixels together with the input data and ii in response, change the input data for each pixel block based on the corresponding correction coefficient and the positions of the pixels.

5. The organic light emitting display device of claim 4, wherein the data compensation unit is further configured to apply a plurality of correction values to each of the pixels included in each of the pixel blocks based on the corresponding correction coefficient.

6. The organic light emitting display device of claim 4, wherein the data compensation unit is further configured to calculate the correction values by an interpolation method for each pixel based on its position in either the first or the second direction in the corresponding pixel block.

7. The organic light emitting display device of claim 1, wherein the data compensation unit further comprises:
a position calculation unit configured to receive a plurality of clock signals for counting the positions of the pixels, and in response, to generate position information of the pixels;
a controller configured to receive the position information of the pixels from the position calculation unit and to retrieve the correction coefficient of the corresponding pixel block;
an interpolation operation unit configured to generate a plurality of correction values for each position of the pixels included in the corresponding pixel block based on the position information and the corresponding correction coefficient; and
a data correction unit configured to change the input data based on the input data and the correction values and to output the changed data.

8. The organic light emitting display device of claim 7, wherein the position calculation unit, includes:
a horizontal position calculator configured to receive a first clock signal for counting the horizontal position of the pixels and in response, to generate horizontal position information of the pixels; and
a vertical position calculator configured to receive a second clock signal for counting the vertical position of the pixels and in response, to generate vertical position information of the pixels.

9. The organic light emitting display device of claim 7, wherein the controller includes a correction coefficient lookup table storing the correction coefficients for each of the pixel blocks.

10. A driving method of a display device, comprising:
receiving a plurality of clock signals for counting positions of a plurality of pixels formed in a pixel unit and generating position information of the pixels, wherein the pixels are divided into a plurality of pixel blocks and wherein each pixel block includes a plurality of adjacent pixels;
retrieving a correction coefficient for each of the pixel blocks from a memory;
changing input data for the pixels of each of the pixel blocks using the corresponding correction coefficient and outputting changed data; and
generating a data signal using the changed data,
wherein the number of pixels arranged in a first direction in each of the pixel blocks is different from the number of pixel arranged in a second direction which intersects with the first direction.

11. The method of claim 10, wherein the pixel unit is divided into at least two areas sharing an overlapping boundary line, and wherein the number of pixels arranged in the same direction as the boundary line in each of the pixel blocks is greater than the number of pixels arranged in the direction in which intersects with the boundary line.

12. The method of claim 10, further comprising:
generating a plurality of correction values respectively corresponding to the pixels included in each of the pixel blocks based on the corresponding correction coefficient after the retrieving,
wherein the generating of the correction values for the pixels is based on the position information of the pixels within the corresponding pixel block, and
wherein the changing the input data comprises applying the corresponding correction value.

13. The method of claim 12, wherein the correction values for the pixels are generated based on an interpolation method for each pixel based on its position in either the first or the second direction in the corresponding pixel block.

14. The method of claim 12, wherein the correction values for the pixels are generated based on their positions in the corresponding pixel block.

15. A method of manufacturing a display device comprising:
forming pixels units at the intersection of a plurality of scan lines and a plurality of data lines, wherein the pixel units comprise a plurality of pixels divided into a plurality of pixel blocks, wherein each pixel block includes a plurality of adjacent pixels;

forming a scan driver configured to supply a plurality of scan signals to the scan lines;

forming a data driver configured to supply a plurality of data signals to the data lines; and forming a data compensation unit configured to i) store a plurality of correction coefficients respectively corresponding to the pixel blocks, ii) change input data for each pixel block based on the corresponding correction coefficient, and iii) supply the changed input data to the data driver, wherein the number of pixels arranged in a first direction in each of the pixel blocks is different from the number of pixel arranged in a second direction which intersects with the first direction.

16. The method according to claim 15 wherein each of the pixels further comprises a plurality of transistors.

17. The method according to claim 16, wherein each of the transistors comprises a semiconductor layer that is formed of polycrystalline silicon (poly-si) or amorphous silicon (a-si).

* * * * *